1,947,857

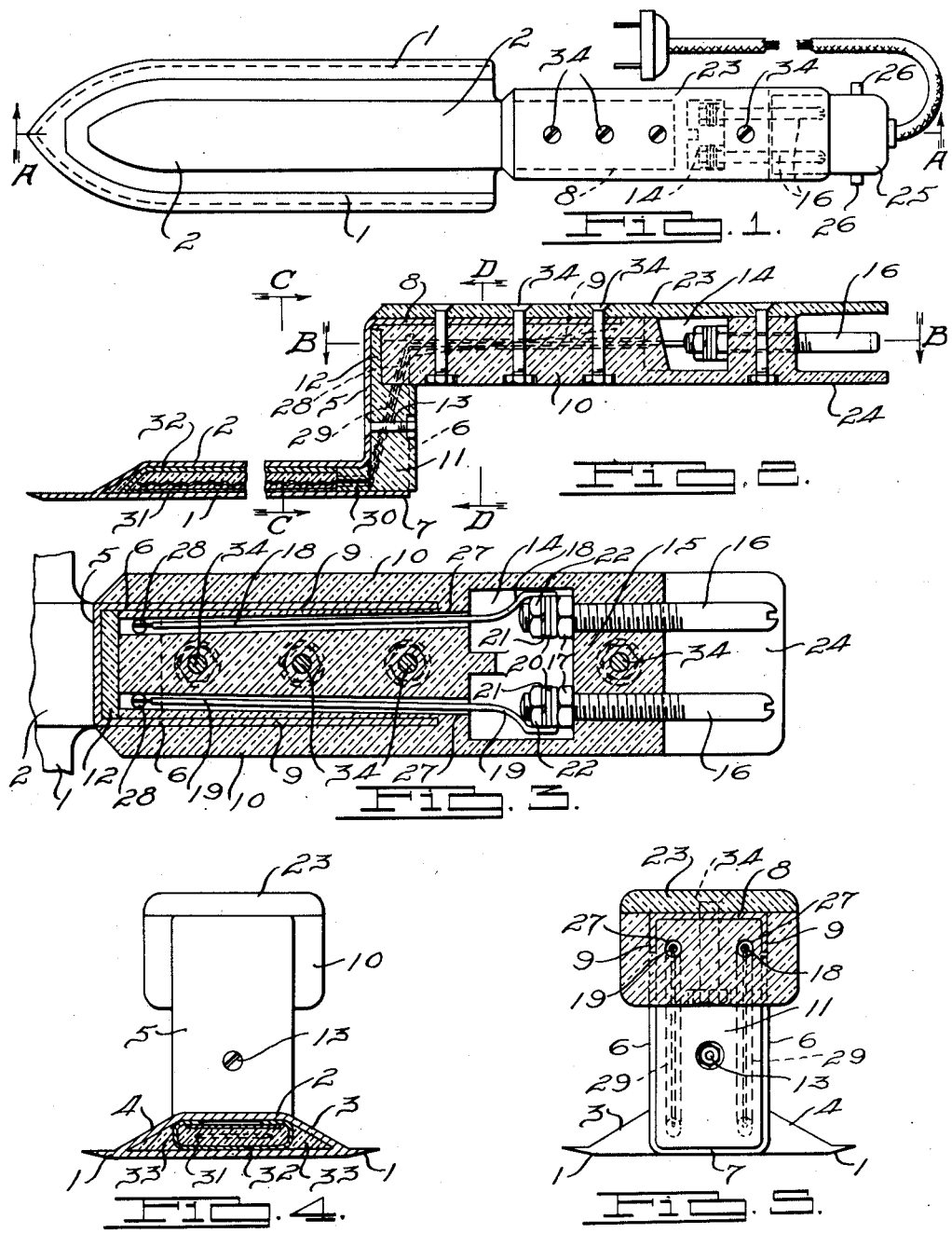
Feb. 20, 1934.   P. KREBS   1,947,857
ELECTRICALLY HEATED KNIFE
Filed July 5, 1932
INVENTOR
Paul Krebs.
BY
ATTORNEY Patented Feb. 20, 1934

UNITED STATES PATENT OFFICE 1,947,857

ELECTRICALLY HEATED KNIFE

Paul Krebs, Detroit, Mich.

Application July 5, 1932. Serial No. 620,823

2 Claims. (Cl. 219—21)

This invention relates to electrically heated knives and the object of the invention is to provide a knife in which the blade is heated by electricity and in which the heating unit may be removed and replaced.

Another object of the invention is to provide an electrically heated knife provided with a fiber handle and having enclosed standard connector pins by which the device may be connected in an electric circuit.

A further object of the invention is to provide an electrically heated knife having the insulation so arranged about the handle that the hand cannot come into contact with the blade in normal use.

A further object of the invention is to provide a knife blade having a housing built up to receive standard heating units of various capacity suitable to the requirements of the temperature needed in bee-keepers work or in bakeries or other places where heated knives are utilized.

These objects and the several novel features of the invention are hereinafter more fully described and claimed and the preferred form of construction by which these objects are attained is shown in the accompanying drawing in which—

Fig. 1 is a plan view of an electrically heated knife embodying my invention.

Fig. 2 is an enlarged section taken on line A—A of Fig. 1.

Fig. 3 is an enlarged section taken on line B—B of Fig. 2.

Fig. 4 is an enlarged section taken on line C—C of Fig. 2.

Fig. 5 is an enlarged section taken on line D—D of Fig. 2.

The device comprises a blade 1 shown more particularly in Figs. 1, 2 and 4 and a sheet metal housing 2 is welded to the blade 1 to provide a compartment for the electric heating unit. The sides 3 and 4 of the housing 2 extend at an angle of about 30 degrees, as shown, and this housing 2 is provided with an upwardly extending portion 5 to provide an off-set between the blade and handle. The portion 5 is provided with flanges 6 at the opposite edges and the end 7 of the blade 1 is welded to these flanges as indicated in Fig. 5. The portion 5 is also provided with a horizontal portion 8 for attachment to the handle and this portion 8 is provided with depending flanges 9 shown in Figs. 2, 3 and 5 which strengthen the horizontal portion. The handle comprises a block 10 of fiber or other insulating material and this block is recessed to receive the horizontal portion 8 and flanges 9, as shown in Fig. 5. A fiber insulating block 11 is also provided which fits in the recess provided between the flanges 6 of the portion 5 and the end 7 of the blade 1, as shown in Figs. 2 and 3, and this member 11 is provided with an upwardly extending end 12 engaging the end of the insulating handle member 10. This fiber block 11 is secured in place by means of a bolt 13 and is provided with a recess for the nut which is threaded onto the bolt. The member 10 is provided, as shown in Figs. 2 and 3, with a recess 14 and an insulating wall 15 is provided through which the standard connector pins 16 extend. Within the recess 14, each connector pin is provided with a nut 17 and the circuit wires 18 and 19 are secured to the connector pins by means of flat washers 20 and lock washers 21 and nuts 22 are provided to secure the parts together.

The cover member 23 extends over the portion 8 of the blade housing and over the recess 14 and also over the ends of the standard connector pins 16 while the block 10 is formed to provide a portion 24 which extends beneath the connector pins 16. By this arrangement, the connector pins are enclosed and are adapted to receive a standard connector plug 25, shown in Fig. 1, which may if desired be provided with a switch operated by the switch buttons 26. The circuit wires 18 and 19 extend through conduits 27 provided therefor in the block 10 and extend downwardly through conduits 28, as shown in Figs. 2 and 3, and thence through conduits 29 provided in the block 11 and through an insulator 30 provided in the end of the heater compartment. The electric heater itself may consist of a resistance wire 31 encased in insulating material and provided with an outer shell 32 so that the electric heating element may be readily removed from the chamber formed by the housing 2. This electric heater is shown in section in Fig. 4 and the space between the edges of the heater and the edges of the housing may be filled with asbestos at 33, as shown, if desired. The bolt 13, shown in Figs. 2 and 5, extends through the block 11 between the two circuit wires and the block 11 engages the insulator 30 and holds the insulator and heating element in place and prevents lengthwise movement of the heater element. The insulator 30 is preferably made of asbestos and is of a proper length to take up the space between the end of the heating element and the block 11. Bolts 34 are also provided which connect the handle parts together and which also extend between the circuit wires.

If for any reason it becomes necessary to replace the heating element, the bolts 34 are first removed and the circuit wires are then disconnected from the connecting pins and the bolt 13 is then removed to allow disassembly of the members 10 and 11 at which time, the insulator plug 30 and heating element may be withdrawn or removed from the knife and replaced with a new element, if desired. The knife is excellently adapted for use as an uncapping knife by bee-keepers and is also excellently adapted for use in bakeries in cutting through different kinds of confections and baked goods.

From the foregoing description, it becomes evident that the device is very simple and efficient in operation, will not easily get out of order, may be easily assembled or disassembled and provides a device which accomplishes the objects described.

Having thus fully described my invention, its utility and mode of operation, what I claim and desire to secure by Letters Patent of the United States is

1. In an electrically heated knife, a blade, a housing mounted on the blade and having sloping sides, the housing being provided with an upright portion and the blade extending rearwardly of the said upright portion, a heating element within the housing on the blade, an insulating block secured to the upright portion of the housing and supported on the portion of the blade extending rearwardly of said upright portion, the housing terminating in a handle portion, an insulating handle member secured to said handle portion and engaging against said insulating block, a pair of electric terminals carried by the insulating handle and lead wires extending from said terminals through the insulating handle and insulating block to the heating element, the lead wires being enclosed and protected throughout their length.

2. In an electrically heated knife, a blade, a housing on the blade provided with an upright portion terminating in an off-set portion extending parallel with the blade, the rear of the blade extending beyond the upright portion of the housing, an insulating handle secured to the off-set parallel portion of the housing and an insulating block secured to the upright portion of the housing and supported on the portion of the blade extending rearwardly of the upright portion of the housing, an electric heating element within the housing portion on the blade and circuit wires leading through the insulating handle and insulating block, the circuit wires being enclosed and protected throughout their length.

PAUL KREBS.